US012472617B2

(12) United States Patent
Hanlon et al.

(10) Patent No.: US 12,472,617 B2
(45) Date of Patent: Nov. 18, 2025

(54) VIBRATION DAMPER FOR HAND-OPERATED STRIKING TOOLS

(71) Applicant: JS Products, Inc., Las Vegas, NV (US)

(72) Inventors: Jared W. Hanlon, Las Vegas, NV (US); Chungeng Chen, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 371 days.

(21) Appl. No.: 17/986,467

(22) Filed: Nov. 14, 2022

(65) Prior Publication Data

US 2023/0150107 A1 May 18, 2023

Related U.S. Application Data

(60) Provisional application No. 63/279,277, filed on Nov. 15, 2021.

(51) Int. Cl.
*B25G 1/01* (2006.01)
*B25G 3/14* (2006.01)
*B25G 3/26* (2006.01)

(52) U.S. Cl.
CPC ................. *B25G 1/01* (2013.01); *B25G 3/14* (2013.01); *B25G 3/26* (2013.01)

(58) Field of Classification Search
CPC ... B25G 1/01; B25G 1/02; B25G 1/10; B25G 1/12; B25G 3/02; B25G 3/10; B25G 3/14; B25G 3/16; B25G 3/26; B25G 3/28; B25G 3/32; B25D 1/02; B25D 1/08; B25D 1/12; B26B 23/00
See application file for complete search history.

(56) References Cited

U.S. PATENT DOCUMENTS 1,144,035 A 6/1915 John et al.
1,210,539 A 1/1917 Budd
1,508,395 A * 9/1924 Isham ...................... B25G 3/02 403/243
2,211,682 A 8/1940 Yeoman
2,989,101 A 6/1961 Carmien
3,745,598 A * 7/1973 Krell .................. A47G 27/0487 7/103
4,172,483 A * 10/1979 Bereskin .................. B25G 1/00 81/20
4,753,137 A 6/1988 Kennedy
5,031,272 A * 7/1991 Carmien .................. B25G 3/34 403/267
6,016,722 A 1/2000 Gierer et al.
6,363,817 B1 * 4/2002 Lamond ................... B25D 1/12 81/22
6,463,832 B1 10/2002 Cox
6,595,087 B2 * 7/2003 Whalen .................... B25D 1/12 81/22

(Continued)

FOREIGN PATENT DOCUMENTS

CN 202146424 2/2012
CN 111618794 9/2020

(Continued)

*Primary Examiner* — Robert J Scruggs
(74) *Attorney, Agent, or Firm* — Snell & Wilmer, LLP

(57) ABSTRACT

A striking tool has a vibration damper in the form of a vibration damping core located between a top end of the hand and a head thereof, and an overstrike assembly in the form of an overstrike sleeve located over the core below the head.

20 Claims, 9 Drawing Sheets

(56) References Cited

U.S. PATENT DOCUMENTS

| | | | | |
|---|---|---|---|---|
| 6,739,218 | B2 | 5/2004 | Yang | |
| 6,945,138 | B1 | 9/2005 | Kreitzer | |
| 7,107,874 | B1 | 9/2006 | Chen | |
| 7,448,299 | B1 * | 11/2008 | Chen | B25G 3/04 81/22 |
| 8,438,953 | B2 | 5/2013 | Chen | |
| 9,296,100 | B2 | 3/2016 | Descombes et al. | |
| 9,731,413 | B1 * | 8/2017 | Huner | B25D 1/00 |
| 10,800,023 | B1 * | 10/2020 | Ferris | A62B 3/005 |
| 2014/0260812 | A1 | 9/2014 | Chang | |
| 2016/0008966 | A1 * | 1/2016 | Stokes | B25D 1/12 81/22 |
| 2023/0311287 | A1 * | 10/2023 | Galloway | B25D 1/045 81/2 |

FOREIGN PATENT DOCUMENTS

| | | |
|---|---|---|
| KR | 100603464 | 7/2006 |
| KR | 20140002536 | 5/2014 |
| KR | 101814913 | 1/2018 |
| KR | 101980594 | 5/2019 |

* cited by examiner

VIBRATION DAMPER FOR HAND-OPERATED STRIKING TOOLS

RELATED APPLICATION DATA

This application claims priority to U.S. Provisional Application Ser. No. 63/279,277, filed Nov. 15, 2021, which is incorporated herein by reference in its entirety.

FIELD OF THE INVENTION

The present invention relates to handled tools, and particularly handled striking tools.

BACKGROUND OF THE INVENTION

Various tools are known which are designed to be used to strike an object, such as a workpiece or other object. Such tools include, but are not limited to, hammers, mauls, axes, mattocks and the like.

These tools typically have a handle which is connected to the head. When the head strikes an object, substantial energy may be transmitted back through the head to the handle, and then to the operator of the tool. This can fatigue or even injure the user.

Various solutions have been proposed for limiting the transfer of energy to the user when using these types of tools. However, many of these solutions are relatively ineffective. Other solutions are very complex and thus greatly increase the cost and complexity of manufacturing the tool.

An improved striking tool having vibration damping technology is desired.

SUMMARY OF THE INVENTION

Aspects of the invention comprise a vibration damper for a striking tool, a striking tool having a vibration damper, and methods of making/assembling a striking tool having a vibration damper.

In one embodiment, a striking tool with a vibration damper comprises a handle having a first end and a second end, a vibration damping core having a top end, an opposing bottom end and a passage extending into the bottom end, the vibration damping core located on the first end of the handle so that the first end of the handle is located in the passage through the vibration damping core, and a head having a top end and a bottom end and a passage therethrough from the first end to the second end, the head located on the vibration damping core such that at least a portion of the vibration damping core is located in the passage through the head and wherein at least a portion of the bottom end of the vibration damping core extends downwardly below a bottom of the head.

In one embodiment, the vibration damping core has a draft such that an outer dimension of the vibration damping core is greater at the top end than the bottom end, and where a dimension of the passage through the head at the top end thereof is smaller than the outer dimension of the vibration damping core at its top end, preventing the head from passing over the vibration damping core from the bottom towards the top thereof.

In another embodiment, the striking tool may further comprise an overstrike protector. The overstrike protector may be located over a portion of the handle below the bottom of the head, including the portion of the vibration damping core that extends below the head.

The vibration damping core may be connected to the handle, such as by one or more pins. Likewise, the overstrike protector may be connected to the vibration damping core, such as by one or more pins.

The passage through the vibration damping core and the exterior of the vibration damping core may include projections, such as longitudinal ribs, for engaging the handle in the passage of the core and the head at the exterior of the core.

Further objects, features, and advantages of the present invention over the prior art will become apparent from the detailed description of the drawings which follows, when considered with the attached figures.

DETAILED DESCRIPTION OF THE INVENTION

Figure 1:
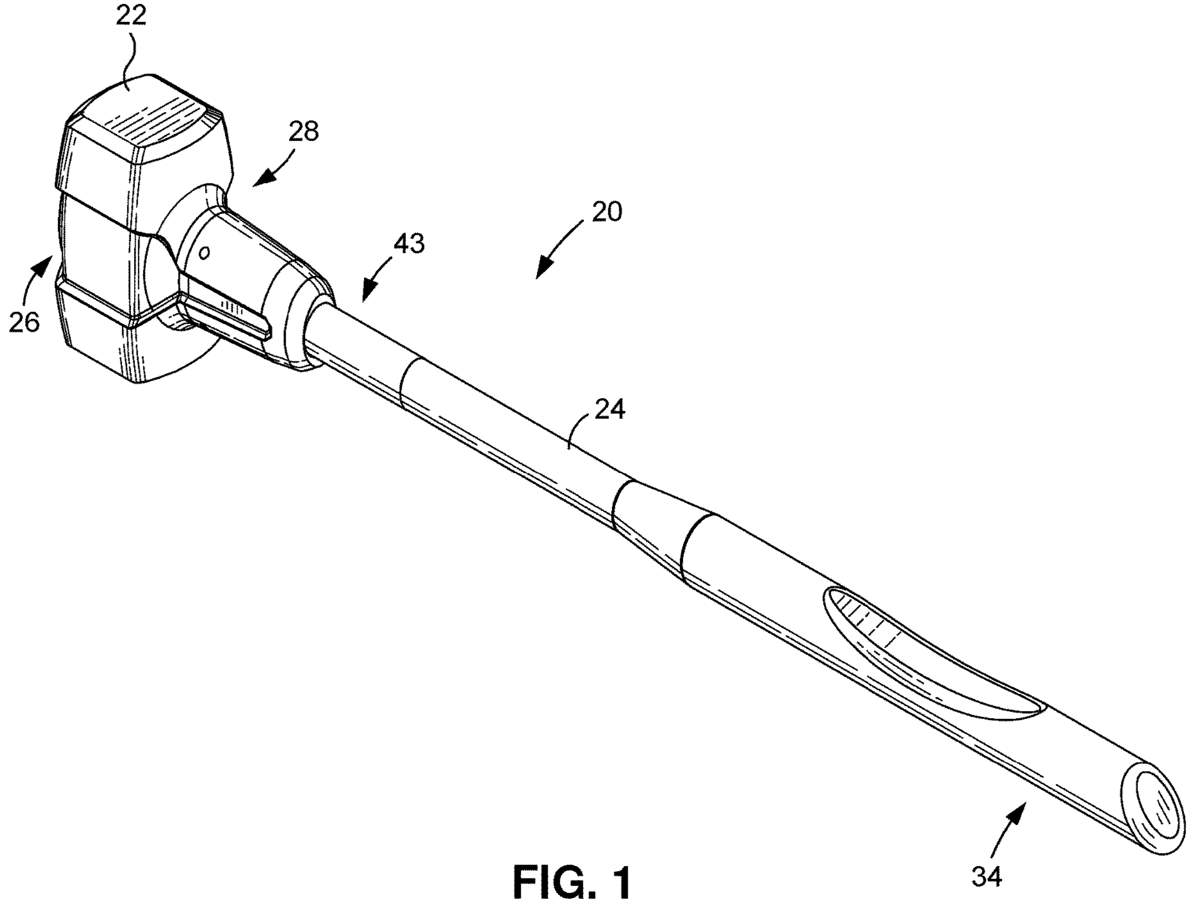
FIG. 1 is a perspective view of a striking tool with vibration damping technology in accordance with an embodiment of the invention.
Figure 2:
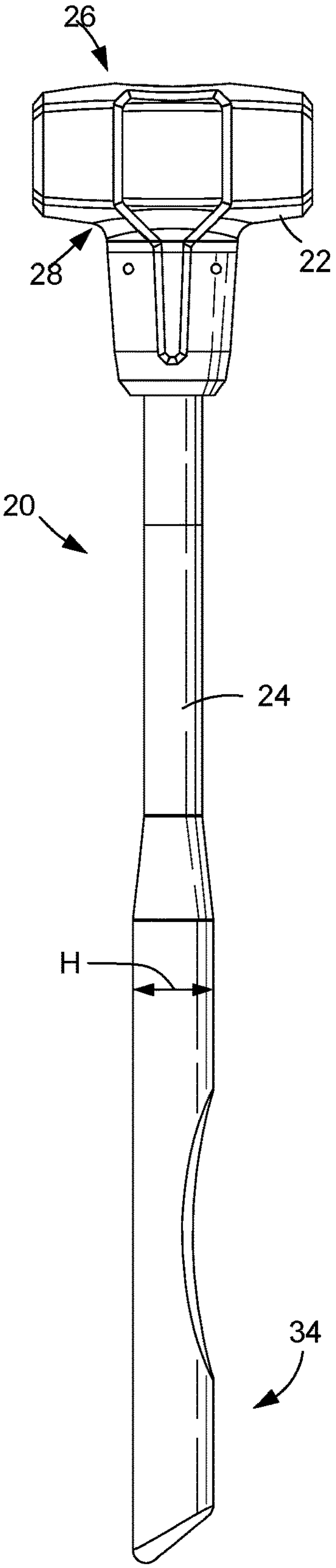
FIG. 2 is a front view of the striking tool illustrated in FIG. 1.
Figure 3:
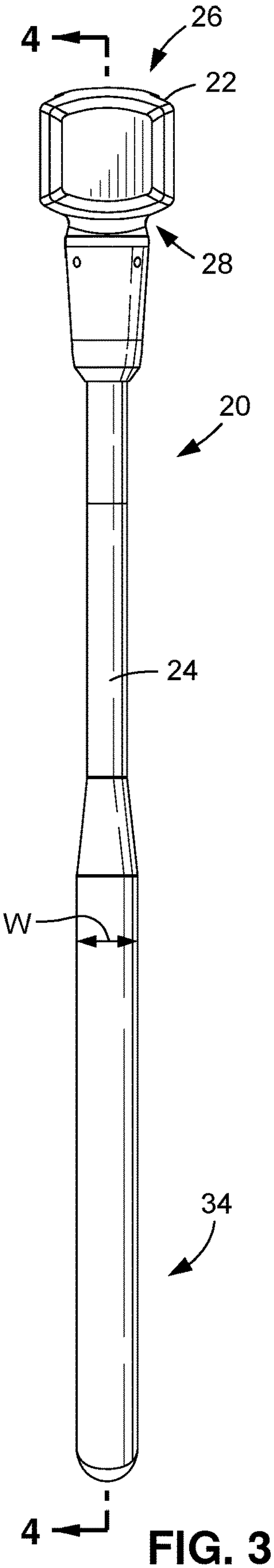
FIG. 3 is a second side view of the striking tool illustrated in FIG. 1.
Figure 4:
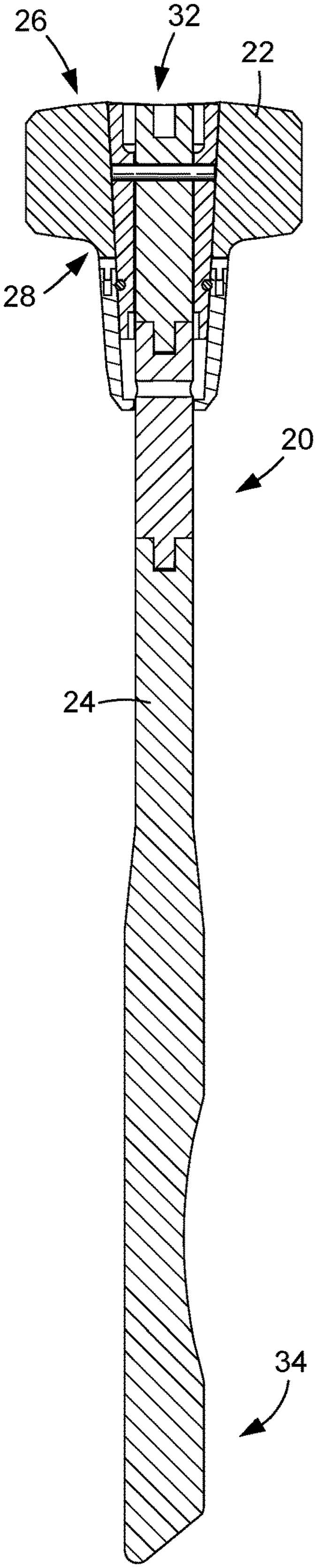
FIG. 4 is a cross-sectional view of the striking tool illustrated in FIG. 3, taken along line 4-4 therein.
Figure 5:
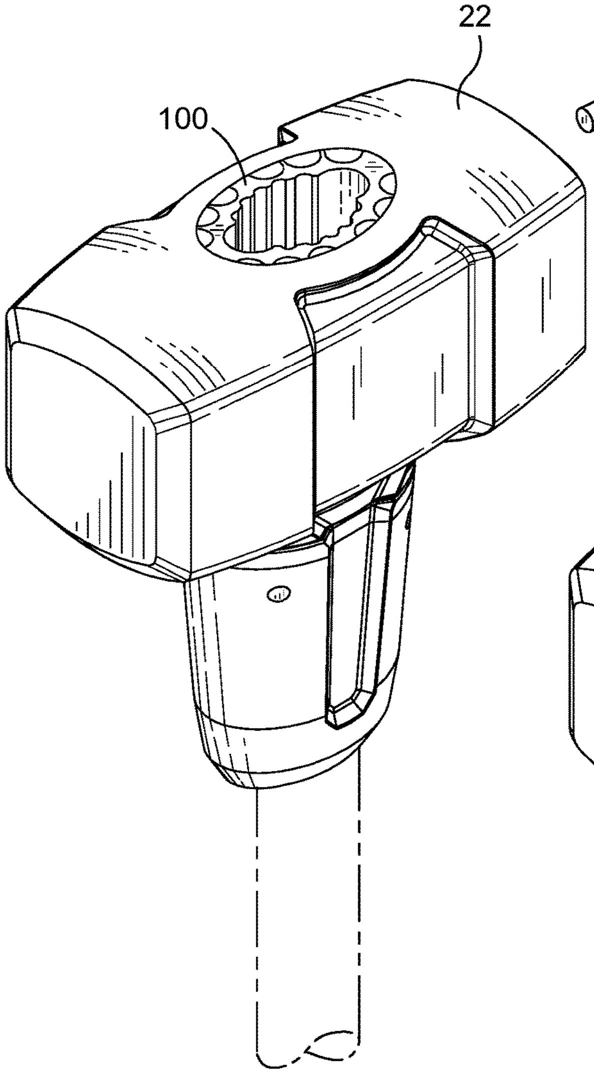
FIG. 5 is an enlarged perspective view of a head portion of the striking tool illustrated in FIG. 1.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is vibration damping technology. Other embodiments of the invention comprise a tool, such as a striking tool, with vibration damping technology. In one embodiment, the vibration damping technology comprise a vibration damper. The vibration damper may comprise a vibration damping core that is located between a handle and head of a striking tool. The vibration damper may further comprise an overstrike assembly, such as comprising an overstrike sleeve and a spacer. Additional aspects of the invention comprise methods of assembling/manufacturing a tool with vibration damping technology.

FIGS. 1-4 illustrate a tool 20 in accordance with the invention, wherein the tool includes vibration damping technology in accordance with the invention. The tool 20 may comprise a striking tool, and preferably a striking tool which is intended or designed to be manually operated. In one embodiment, the tool 20 comprises a head 22 for selective engagement with an object (e.g. such as to be used to strike an object) and a handle 24 which is connected to the head 22, the handle 24 designed or intended to be used by a user to manipulate the head 22.

The head 22 may have various configurations, including shapes and sizes, such as depending upon the desired or intended use. For example, the head 22 might comprise a hammer or sledge-type head which defines one or more generally planar striking faces, such as at one or both ends of the head. The head 22 might comprise an axe or hatchet head, such as having at least one tapered cutting face. The head 22 might comprise a splitter head, such as having one or more tapered or wedge shaped faces or ends. The head 22 might comprise a mattock, such as having one or more elongate pick elements. Of course the head 22 might have other configurations.

In various embodiments, the head 22 may be constructed from metal, such as by being cast, etc. The size and weight of the head 22 may vary, such as depending upon the desired use.

In one embodiment, the head 22 has a top 26 and a bottom 28. A passage 30 (best seen in FIG. 6) extends into the bottom 28 and may extend through the head 22 to the top 26.

The handle 24 preferably has a top end 32 (see FIG. 4) and a generally opposing bottom end 34. The shape of the handle 24, including its length, may vary depending upon the desired usage of the tool 20. In one embodiment, the handle 24 may be generally oval-shaped in cross-section in one or more portions, such as a gripping portion towards the bottom end 34 thereof, where that portion has a height in a direction H (see FIG. 2) which is greater than a width in a direction W (see FIG. 3), where the width direction is generally perpendicular to the height direction H and where the directions H and W are perpendicular to a longitudinal axis through the handle from end to end. The handle 24 may be constructed from various materials, such as wood, fiberglass or the like. In one embodiment, other portions of the handle 24 may have other shapes. For example, as illustrated, a top portion of the tool towards the top end 32 thereof may be generally circular in shape.

In one embodiment, the tool 20 includes vibration damping technology, such as a vibration damper, in accordance with the present invention. As best illustrated in FIGS. 5-9, the vibration damper may comprise a vibration damping core 100. The vibration damping technology may further comprise an overstrike assembly, such as comprising an overstrike sleeve 102 and a spacer 104.

One embodiment of a vibration damping core 100 is illustrated in FIGS. 10-14. As illustrated, the core 100 has a top end and a bottom end. A passage 106 extends into the core 100 from at least the bottom end, and preferably therethrough from end to end as illustrated. The passage 106 is designed to accept therein the top end 32 of the handle 24.

Figure 13:
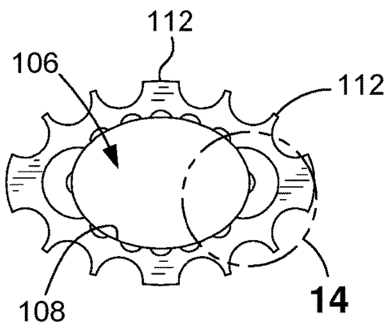
FIG. 13 is a top view of the damping core illustrated in FIG. 10.
Figure 14:
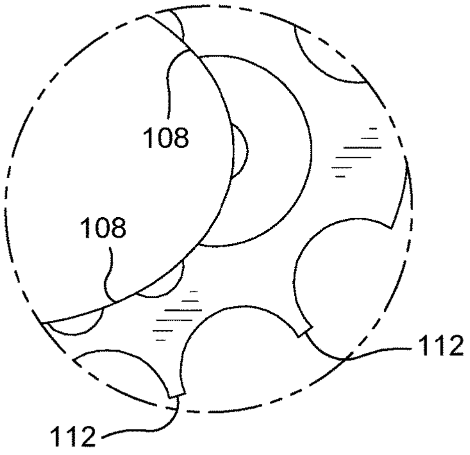
FIG. 14 is an enlarged view of the portion of the damping core indicated in FIG. 13.
Figure 12:
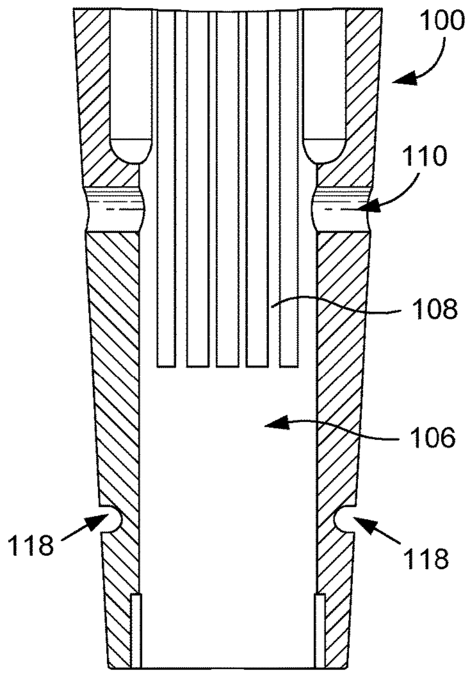
FIG. 12 is a cross-sectional view of the damping core illustrated in FIG. 11, taken along line 12-12 therein.
Figure 18:
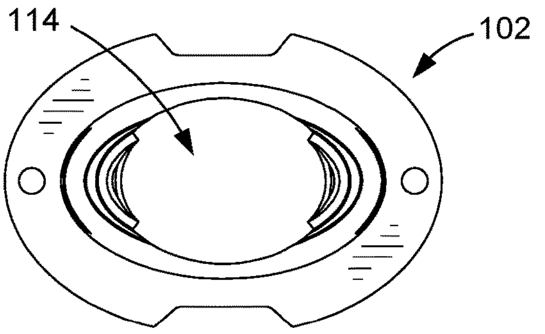
FIG. 18 is a top view of the overstrike sleeve illustrated in FIG. 15.
Figure 15:
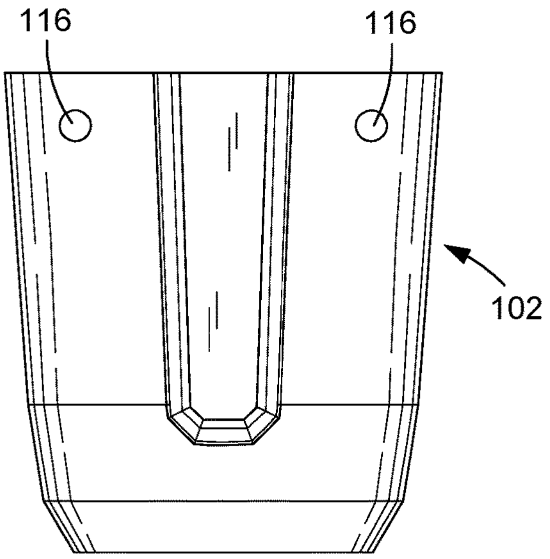
FIG. 15 is a front view of an overstrike sleeve in accordance with an embodiment of the invention.
Figure 16:
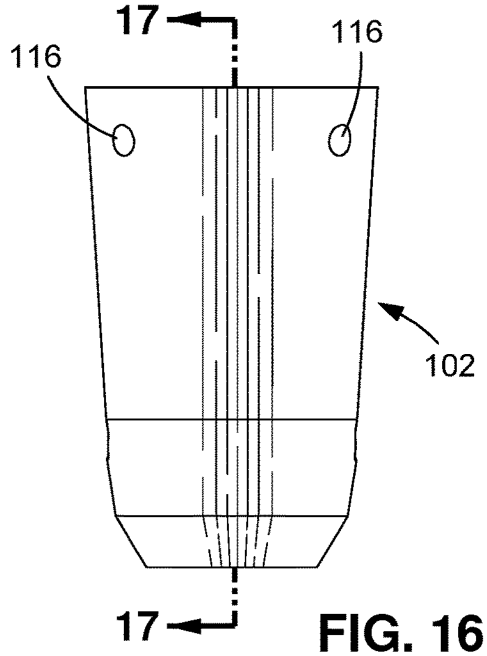
FIG. 16 is a side view of the overstrike sleeve illustrated in FIG. 15.

In one embodiment, as best illustrated in FIGS. 12-14, one or more protrusions 108 may be defined in the passage 106. The protrusions 108 might be defined, for example, by elongate slots or channels formed in the core 100 in the passage 106. The protrusions 108 define areas of contact with the exterior of the handle 24, thus limiting the surface area contact therebetween (as compared, for example, to if the interior of the core 100 at the passage 106 were smooth). In one embodiment, the protrusions 108 might have the form of elongate ribs or the like which extend generally parallel to a line extending through the core 100 from end to end. In other embodiments, however, the protrusions 108 might have other shapes, such as comprising nubs, etc. In a preferred embodiment, the size or diameter of the passage 106 is generally constant from the top to the bottom of the core 100 (even though, as described below, in a preferred embodiment, the exterior of the core is not of a constant size).

Figure 11:
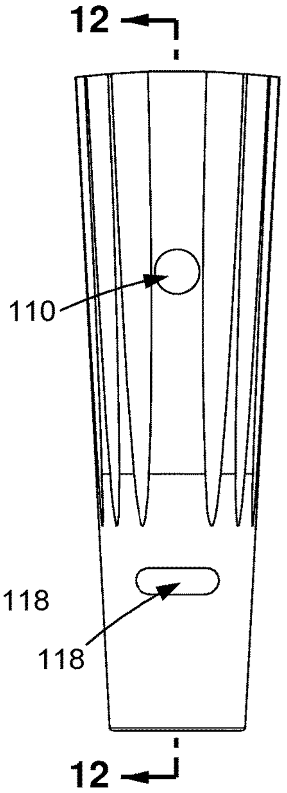
FIG. 11 is a side view of the damping core illustrated in FIG. 10.

In one embodiment, as best illustrated in FIGS. 11 and 12, at least one aperture 110 may be defined through the core 100, preferably in the "H" direction (corresponding to the handle 24), such as along a centerline of the core 100. The aperture 110 is preferably aligned with a corresponding aperture in the handle 24. A pin 111 (see FIG. 6) is preferably passed through the aperture 110 in the core 100 and through the handle 24, thus locking the core 100 to the handle 24. While a single aperture and pin may be utilized, in other embodiments, additional pins might be utilized. In a preferred embodiment, the length of the pin is such that it is inset into the core 100 and otherwise does not contact the head 22, thus reducing the transmission of force from the head to the core.

Figure 10:
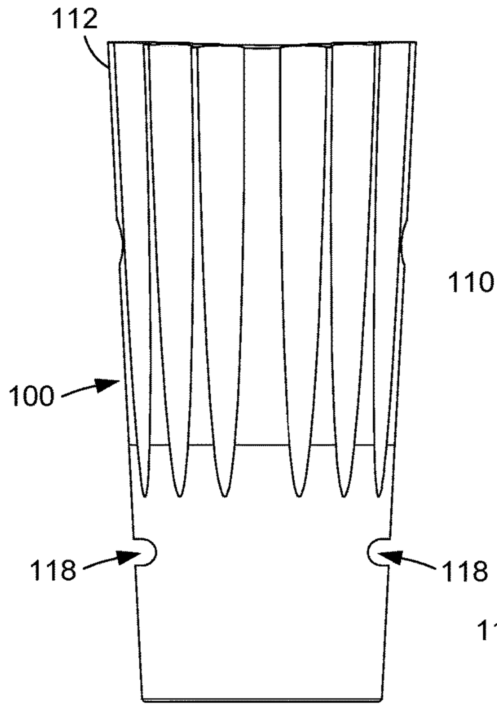
FIG. 10 is a front view of a damping core in accordance with an embodiment of the invention.

At least a portion of the core 100 is configured to be located in the passage 30 in the head 22 of the tool 20. The core 100 has an exterior dimension which is sized to fit into the passage 30. At the same time, as illustrated in FIGS. 10 and 11, the exterior dimension of the core 100 is greater at the top end than the bottom end (e.g. it tapers or has a draft, such as of 3 to 5 degrees), thus ensuring that the head 22 is captured by the core 100 and can't be removed from the core 100 at its top end (e.g. when the core 100 is placed on the handle 24, the head 22 will slide upwardly towards the top end of the core 100, but won't pass over the top of the core 100 so as to be removed from the handle 24). Preferably, the shape of the exterior of the core 100 is generally the same (as illustrated, generally oval and having a major axis which is longer than its minor axis) from top to bottom, but where, due to the draft, the overall dimensions reduce proportionally from top to bottom (e.g. at the bottom, the major and minor axes may be 0.95 of the major and minor axes at the top).

As best illustrated in FIGS. 10, 13 and 14, the exterior of at least a portion of the core 100, such as at the top end, preferably defines one or more protrusions 112. These protrusions 112 contact the head 22 in a manner which limits the surface area contact therebetween (as compared to if the exterior of the core 100 were smooth).

In one embodiment, the core 100 is constructed from at least one (and may be constructed from more than one, such as two or three) materials which are resilient. For example, the core 100 might be constructed from rubber or silicone having a Shore A hardness. The core 100 might be constructed in a molding process. Features of the core 100 might be created during the molding process or via alternation thereafter, such as via machining.

Figure 8:
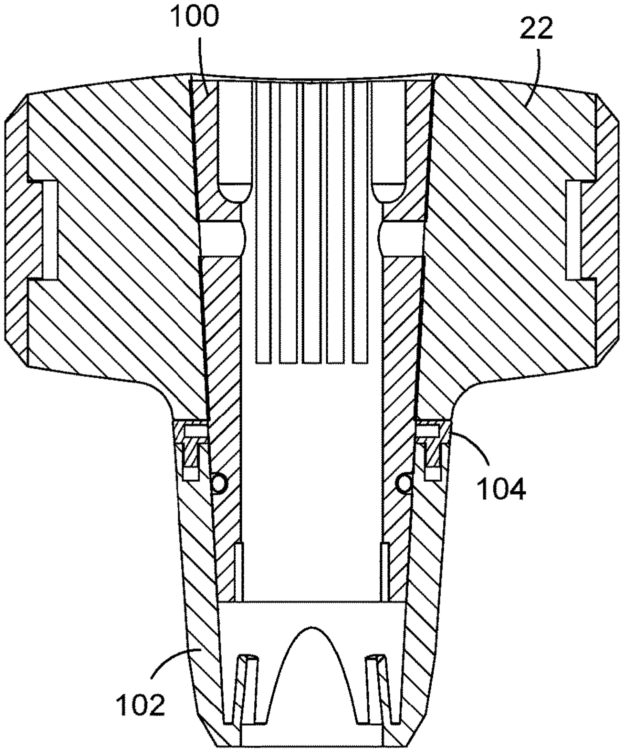
FIG. 8 is a cross-sectional view of the head portion of the striking tool illustrated in FIG. 7, taken along line 8-8 therein.
Figure 9:
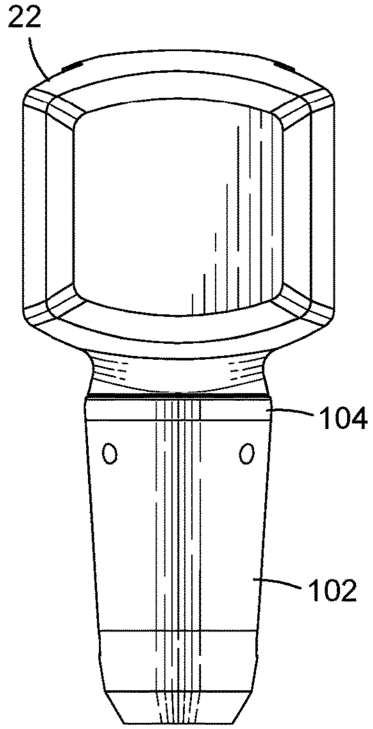
FIG. 9 is a side view of the head portion of the striking tool illustrated in FIG. 7.

In one embodiment, the core 100 is sized, relative to the head 22, so that a bottom end of the core 100 is located exterior to (e.g. protrudes below) the bottom 28 of the head 22, as best illustrated in FIG. 8. This extended portion of the core 100 serves to protect the handle 24 at its interface with the bottom of the head 22, such as to aid in dissipating energy which may cause the handle 24 to break in that location.

Figure 17:
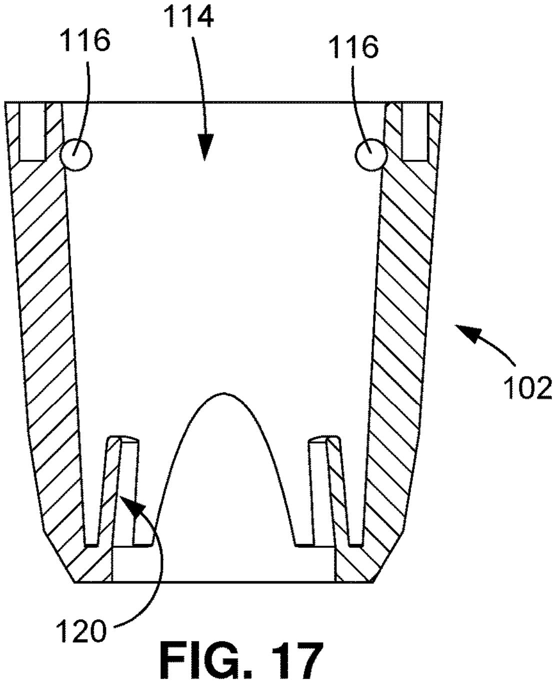
FIG. 17 is a cross-sectional view of the overstrike sleeve illustrated in FIG. 16, taken along line 17-17 therein.

In one embodiment, the vibration damping technology may further comprise an overstrike assembly, such as the sleeve 102 and spacer 104. One embodiment of the sleeve 102 is illustrated in FIGS. 15-18. As illustrated, the sleeve 102 has a top end and a bottom end. The sleeve 102 has a passage 114 therethrough from end to end, as best illustrated in FIG. 17. In one preferred embodiment, the passage 114 is sized so that at the top end, the sleeve 102 can accept therein the portion of the handle 24 with the bottom end of the core 100 thereon (located exterior to the bottom 28 of the head 22), and is sized so that at the bottom end, the sleeve 102 can accept therein the handle 24. When the handle 24 has a non-circular cross-section (such as generally oval), the core 100 has a similar cross-sectional shape, as does the opening 30 in the head 24.

The sleeve 102 is preferably constructed from a durable material and is designed to protect the handle 24 from damage in the region below the head 22. The sleeve 102 might be constructed, for example of a durable rubber or plastic, such as having a Shore D hardness.

In one embodiment, the sleeve 102 is designed to be connected to the tool 20 by connection to the core 100. In one embodiment, the sleeve 102 includes one or more apertures 116 therethrough, such as at generally opposing sides of the sleeve 102. The apertures 116 may extend parallel to the width line W of the handle 24 (e.g. generally perpendicular to the aperture 110 through the core 100). The apertures 116 may align with slots 118 formed in the exterior of the core 100, as best illustrated in FIGS. 10-12. When the sleeve 102 is located on the handle 24 and over the core 100, pins 119 (see FIG. 6) may be passed through the apertures 116 in the sleeve 102 and the aligned slots 118 in the core 100, thus effectively locking the sleeve 102 to the core 100.

As illustrated in FIG. 17, one or more tabs, a ring-shaped member 120 may define the opening at the bottom of the sleeve 102, such as by extending upwardly into the passage 114. As illustrated, the member 120 may have a draft or taper, such as 3-5 degrees inward. The member 120 preferably serves as a centering and/or shock-absorbing element that engages the handle 24.

Figure 6:
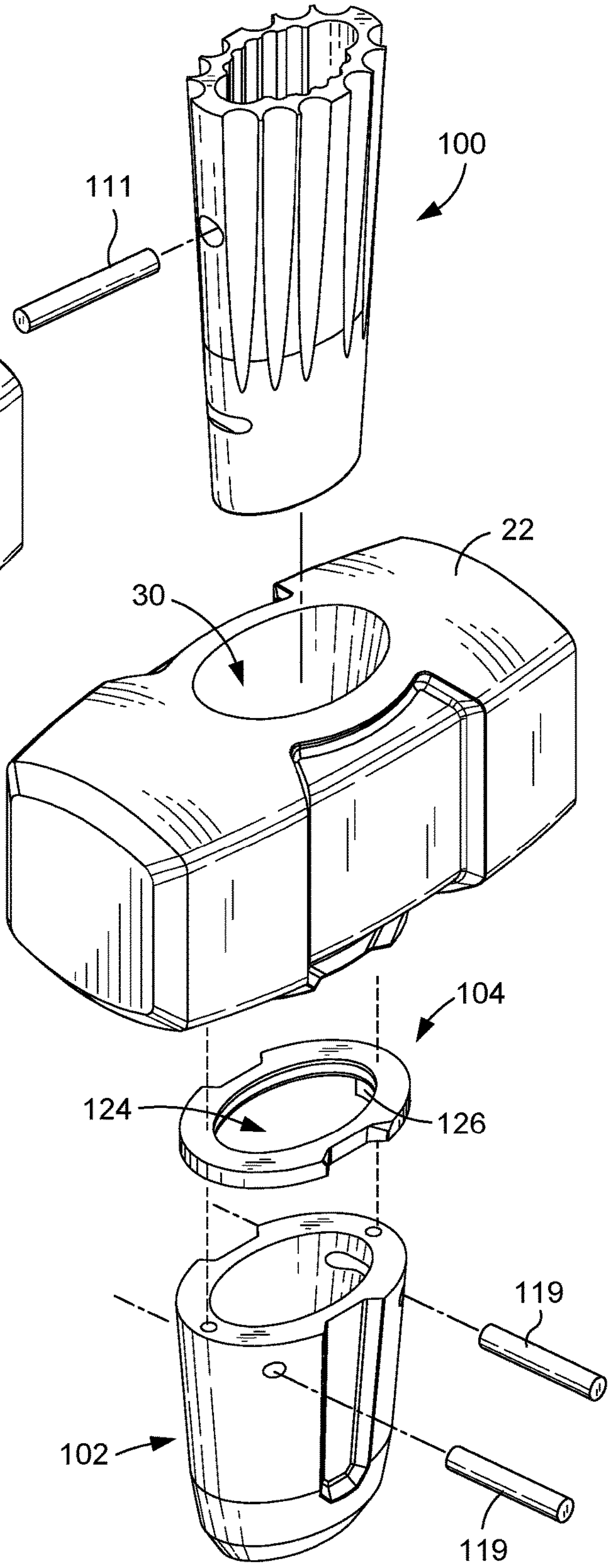
FIG. 6 is an exploded view of the head portion of the striking tool illustrated in FIG. 5.
Figure 7:
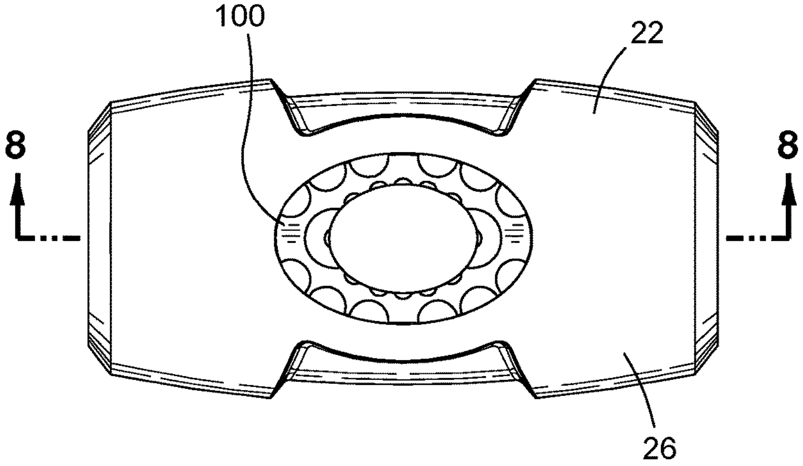
FIG. 7 is a top view of the head portion of the striking tool illustrated in FIG. 5.

In one embodiment, as best illustrated in FIGS. 6 and 8, the spacer 104 is located between the head 22 and the sleeve 102. As illustrated in FIG. 6, the spacer 104 may be generally ring-shaped, thus defining a central opening or passage 124 for accepting the core 100 therein. The spacer 104 may be generally planar on the top, such as for abutting against the bottom 28 of the head 22. The spacer 104 may comprise one or more tabs 126 or other downwardly extending element for location in corresponding openings, channels or the like in the top of the sleeve 102, thus serving to connect and/or locate the spacer 104 relative to the sleeve 102. In some embodiments, more than one spacer 104, such as spacers of different thicknesses, might be located between the head 24 and the top end of the sleeve 102.

While in a preferred embodiment, roll pins or the like may be used to connect the core 100 to the handle 24 and the sleeve 102 to the core 100, other types of fasteners might be used, such as a bolt or the like. Further other numbers of pins might be utilized in the connections.

Another embodiment of a striking tool with vibration damping technology is illustrated in FIGS. 19-27. In the description of this tool, like numbers are used for like elements to those of the embodiment described above.

Figure 19:
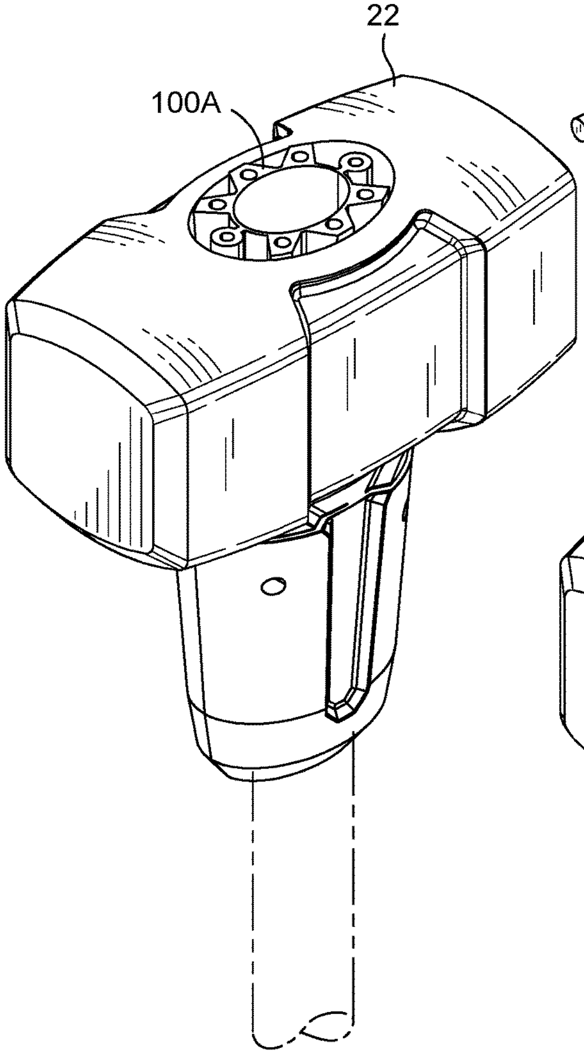
FIG. 19 illustrates a head portion of a striking tool with vibration damping technology in accordance with another embodiment of the invention.
Figure 20:
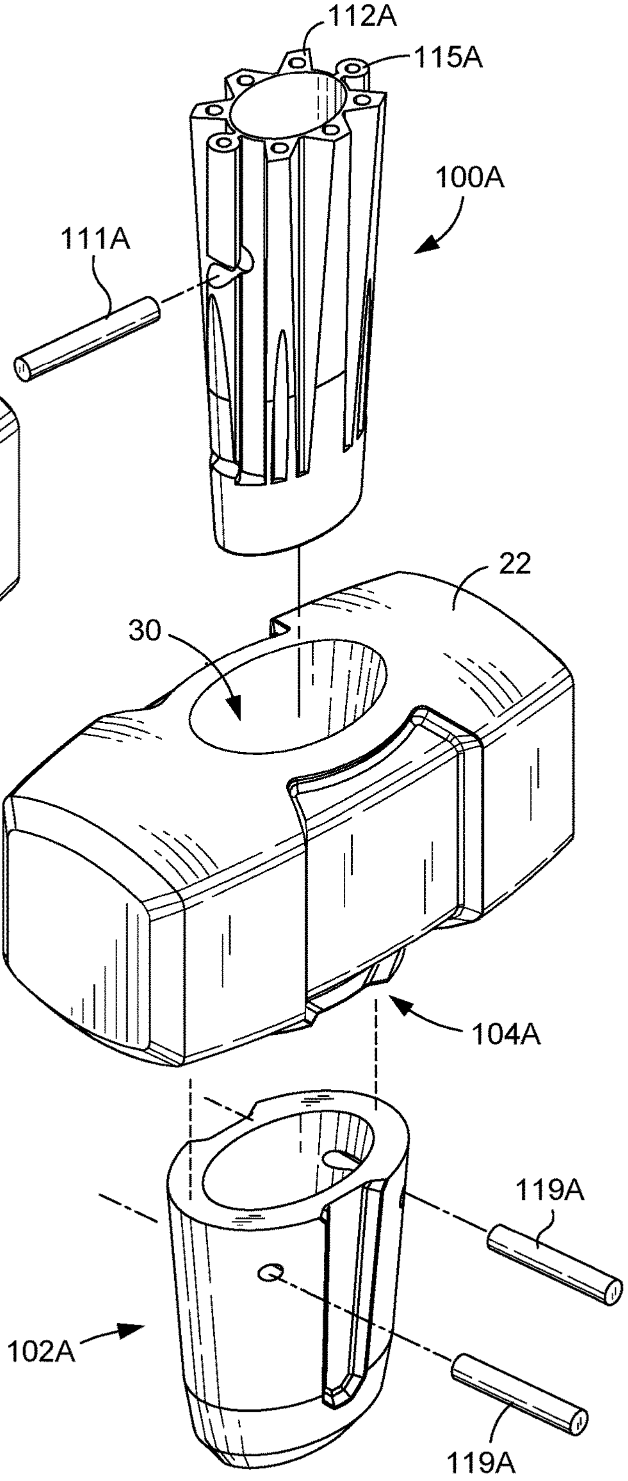
FIG. 20 is an exploded view of the head portion of the striking tool illustrated in FIG. 19.

As illustrated in FIG. 19, the striking tool may again comprise a head 22. A damping core 100A is preferably located between a handle of the tool (shown in dotted line) and the head 22. As illustrated in FIGS. 20-23, the tool may also include an overstrike protector 102A, where the damping core 100A may again be mounted to the handle via a pin or other connector 111A and where the overstrike protector 102A may again be mounted with one or more pins or connectors 119A. The tool may or may not again include one or more spacers 104A.

FIGS. 24-27 illustrate additional details of this embodiment damping core 100A. In general, the core 100A may have a similar configuration to the damping core 100 described above, including comprising the same materials.

Once again, the damping core 100A may comprise a generally tubular body that defines a central passage 106A for accepting the handle of the tool therein. In this embodiment, the interior of the passage 106A may be generally smooth, but it could have surface features similar to those described above relative to the damping core 100A of the first embodiment.

Again, as illustrated, the exterior of at least a portion of the core 100 preferably defines one or more protrusions 112A. These protrusions 112A contact the head 22 in a manner which limits the surface area contact therebetween (as compared to if the exterior of the core 100 were smooth). The protrusions 112A may thus define points or surface of contact 113A with the head 22 when the head 22 is mounted thereon (which points or surfaces 113A are smaller in area than if the exterior were smooth). As illustrated, the protrusions 112A might comprise ribs or similar elements, such as formed in a molding process of the damping core 100A. In one embodiment, as illustrated, the protrusions 112A may be elongate, extending generally parallel to a central axis through the passage 106A. The protrusions 112A might themselves be hollow or define a passage therein, such as to permit additional compression thereof (beyond the inherent compressibility of the material thereof).

Most preferably, this embodiment damping core 100A defines one or more compartments 115A. The compartments 115A may be located at an exterior of the damping core 100A. As illustrated, two compartments 115A are provided at opposing sides thereof, such as near the top thereof. However, other number of compartments 115A might be provided, and in other locations. In general, the purpose of the compartments 115A is to accept a mass body 117A, such as in a passage or opening 121A therein. In one embodiment, the compartments 115A may extend downwardly from the top of the damping core 100A, as may the associated openings 121A therein.

A body 117A may be placed in the opening 121A. The body 117A may comprise, for example, a cylindrical rod, balls or other elements. The body 117A may have a mass, where the mass may vary, such as to achieve a desired damping effect.

Figure 21:
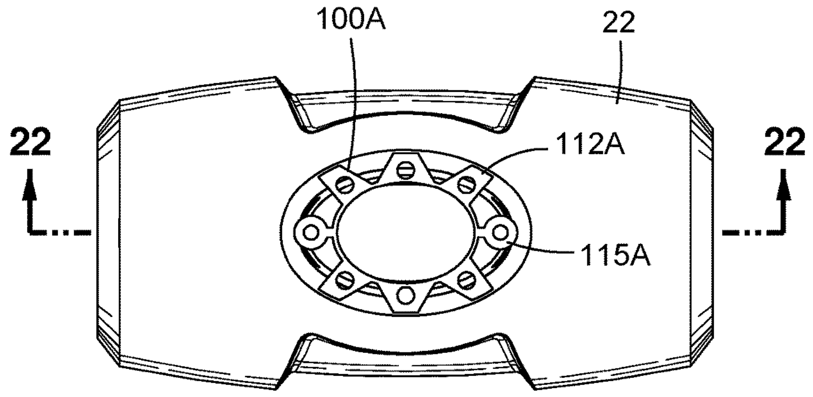
FIG. 21 is a top view of the head portion of the striking tool illustrated in FIG. 19.
Figure 22:
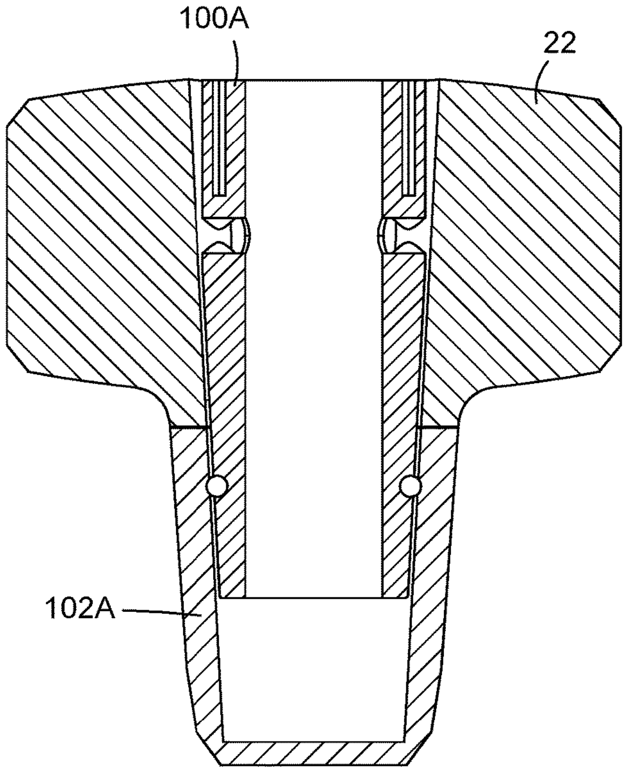
FIG. 22 is a cross-sectional view of the head portion of the striking tool illustrated in FIG. 21, taken along line 22-22 therein.
Figure 23:
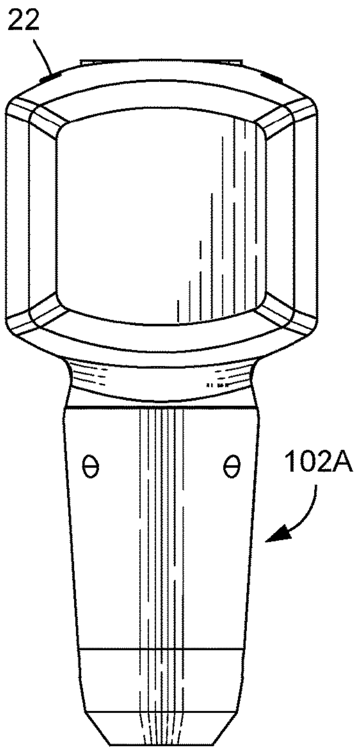
FIG. 23 is a side view of the head portion of the striking tool illustrated in FIG. 21.
Figure 24:
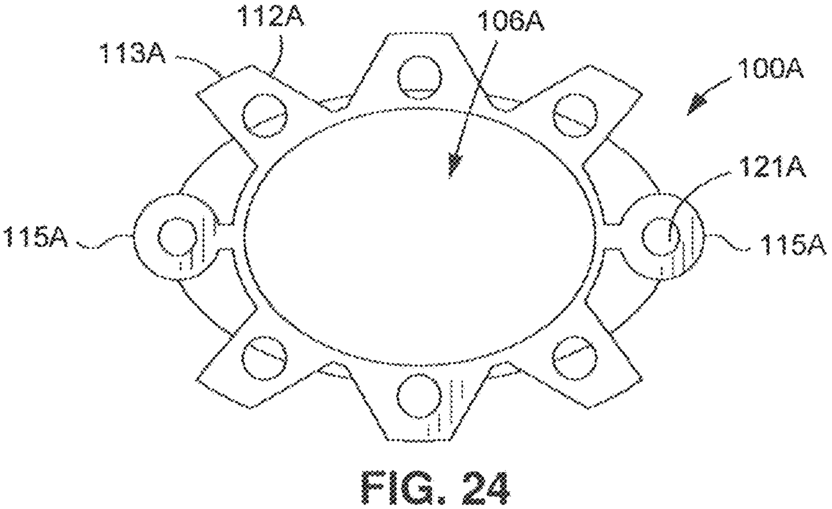
FIG. 24 is a top view of a damping core in accordance with another embodiment of the invention.
Figure 25:
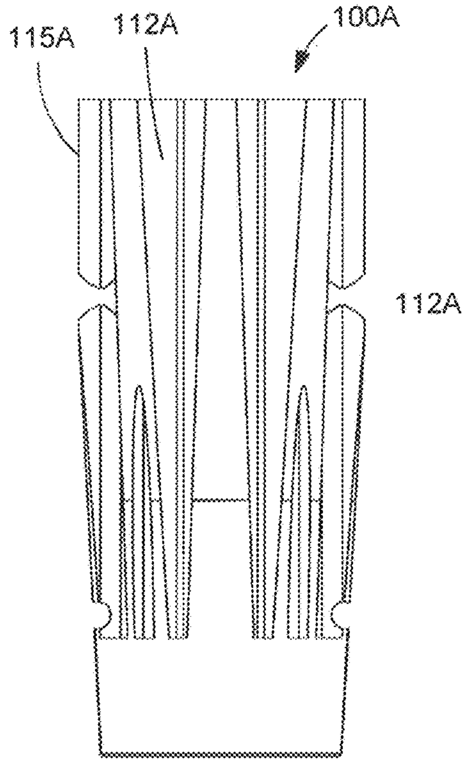
FIG. 25 is a front view of the damping core illustrated in FIG. 24.
Figure 26:
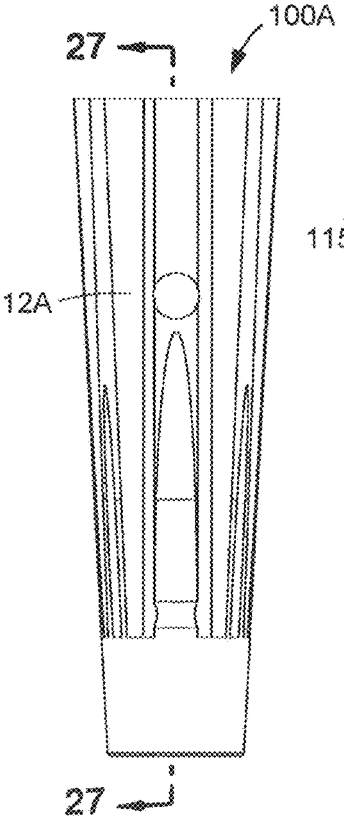
FIG. 26 a side view of the damping core illustrated in FIG. 25.
Figure 27:
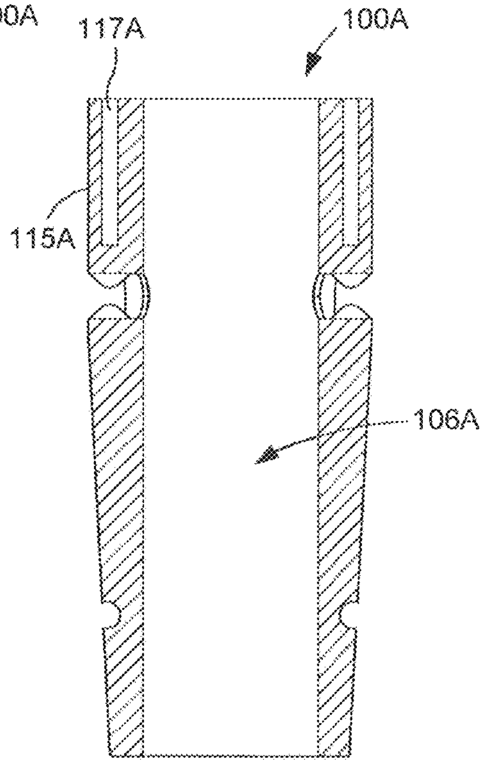
FIG. 27 is a cross-sectional view of the damping core illustrated in FIG. 26, taken along line 27-27 therein.

In particular, in a preferred embodiment, as best illustrated in FIG. 21, the compartment portions 115A of the damping core 100A preferably do not contact the head 22. Instead, the protrusions 112A contact the head 22 and space the head 22 from the compartment portions 115A. During use of the tool, this prevents force/energy from being directly transferred from the head 22 to the compartments 115A and the associated bodies 117A. This allows energy that is transmitted to the damping core 100A via the protrusions 112A to be absorbed by the compartments 115A, and particularly, by the bodies 117A therein. In one embodiment, the bodies 117A may vibrate in response to such energy, where the mass and movement of the bodies 117A serves to dissipate energy which is transmitted to the damping core 100A via the head 22.

As indicated, a manufacturer or use might adjust the configuration of the one or more bodies 117A, such as the shape or mass thereof, such as depending upon the tool—such as the size and shape of the head 22, etc., in order to "tune" the damping core 22 to maximize vibration damping.

In accordance with the invention, a simple vibration damping configuration is provided for a tool, such as a striking tool. The configuration has minimal components and is simple to assemble.

In accordance with the invention, a vibration damping core isolates the head from the handle of the tool, reducing the transmission of force from the head to the handle.

Preferably, the pin or other fastener which mounts the core on the handle does not make contact with the head, thus eliminating that connection as an avenue for force transmission to the handle.

The head of the tool is maintained in position by the taper of the core, such as where the core has a taper or draft of 3 to 5 degrees, thus effectively wedging the head onto the core between the ends of the core (and preventing the head from passing over the top end of the core).

In one embodiment, the core does not comprise a solid block of material with smooth/continuous surfaces, but instead defines a plurality of projections, slots, etc. These features both minimize the contact surface area of the core with the head and handle, but also aid in retarding the transmission of energy through the core itself.

In one embodiment, the vibration damping technology further includes an overstrike assembly (in some embodiments, the core might be utilized without such an assembly). This assembly may comprise the sleeve and spacer. The sleeve provides additional protection and force dissipation features to that provided by the core. One or more spacers may be provided between the sleeve and the head, such as to take up the space therebetween, such as due to play in the head resulting from factors such as temperature variance, humidity variance, manufacturing tolerances, etc.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A striking tool comprising:

a handle having a first end and a second end;

a vibration damping core having a top end, an opposing bottom end and a passage extending into said bottom end, said vibration damping core located on said first end of said handle so that said first end of said handle is located in said passage through said vibration damping core, said vibration damping core having a draft such that an outer dimension of said vibration damping core is greater at said top end than said bottom end;

a head having a top end and a bottom end and a passage therethrough from said first end to said second end, said head located on said vibration damping core such that at least a portion of said vibration damping core is located in said passage through said head and wherein at least a portion of said bottom end of said vibration damping core extends downwardly below a bottom of said head, wherein a dimension of said passage through said head at said top end is smaller than said outer dimension of said vibration damping core at said top end thereof, preventing said head from passing over said vibration damping core from said bottom towards said top thereof; and an overstrike sleeve defining a passage, said overstrike sleeve located on said handle adjacent to said head and over said portion of said vibration damping core which extends below said bottom of said head, said overstrike sleeve connected to said vibration damping core by at least one connector comprising a pin extending through an aperture in said overstrike sleeve and engaging a slot in an exterior surface of said vibration damping core.

2. The striking tool in accordance with claim 1, further comprising at least one connector extending through a portion of said vibration damping core and said handle.

3. The striking tool in accordance with claim 2, wherein said at least one connector comprises at least one pin.

4. The striking tool in accordance with claim 1, wherein said vibration damping core defines a plurality of projections in said passage therethrough for engagement with said handle.

5. The striking tool in accordance with claim 4, wherein said longitudinal projections comprise elongate ribs.

6. The striking tool in accordance with claim 1, wherein said vibration damping core has an exterior surface which defines a plurality of spaced ribs which extend generally parallel to a line extending through the top and bottom of the vibration damping core.

7. The striking tool in accordance with claim 6, wherein said ribs start at said top of said vibration damping core and end before said bottom end thereof.

8. The striking tool in accordance with claim 6, wherein said ribs are defined between slots in said exterior surface of said vibration damping core.

9. The striking tool in accordance with claim 1, wherein said vibration damping core comprise a body constructed of an elastic material.

10. The striking tool in accordance with claim 9, wherein said elastic material comprises rubber or silicone having a Shore A hardness.

11. The striking tool in accordance with claim 9, wherein said body is a unitary molded body.

12. The striking tool in accordance with claim 1, wherein said overstrike sleeve comprises a hard polymer molded body.

13. The striking tool in accordance with claim 1, further comprising a ring-shaped spacer located between said bottom of said head and a top of said overstrike sleeve, wherein said spacer comprises at least one downwardly extending tab for engagement with said overstrike sleeve.

14. The striking tool in accordance with claim 1, wherein said head comprises one of a hammer head, axe head and mattock head.

15. The striking tool in accordance with claim 1, wherein said vibration dampening core has an exterior surface which defines a plurality of head contacting protrusions and one or more compartments circumferentially recessed relative to said protrusions.

16. The striking tool in accordance with claim 15, further comprising at least one mass body located in said one or more compartments.

17. A striking tool comprising:

a handle having a first end and a second end;

a vibration damping core having a top end, an opposing bottom end and a passage extending into said bottom end, said vibration damping core located on said first end of said handle so that said first end of said handle is located in said passage through said vibration damping core, said vibration damping core having a draft such that an outer dimension of said vibration damping core is greater at said top end than said bottom end;

a head having a top end and a bottom end and a passage therethrough from said first end to said second end, said head located on said vibration damping core such that at least a portion of said vibration damping core is located in said passage through said head and wherein at least a portion of said bottom end of said vibration damping core extends downwardly below a bottom of said head, wherein a dimension of said passage through said head at said top end is smaller than said outer dimension of said vibration damping core at said top end thereof, preventing said head from passing over said vibration damping core from said bottom towards said top thereof;

an overstrike sleeve defining a passage, said overstrike sleeve located on said handle adjacent to said head and over said portion of said vibration damping core which extends below said bottom of said head; and a ring-shaped spacer located between said bottom of said head and a top of said overstrike sleeve and having at least one downwardly extending tab for engagement with said overstrike sleeve.

18. The striking tool in accordance with claim 17, wherein said vibration damping core has an exterior surface which defines a plurality of spaced ribs which extend generally parallel to a line extending through the top and bottom of the vibration damping core.

19. The striking tool in accordance with claim 18, wherein said ribs start at said top of said vibration damping core and end before said bottom end thereof, and wherein said ribs are defined between slots in said exterior surface of said vibration damping core.

20. The striking tool in accordance with claim 17, wherein said vibration dampening core has an exterior surface which defines a plurality of head contacting protrusions and one or more compartments circumferentially recessed relative to said protrusions.

* * * * *